(12) United States Patent
Malek Azary (10) Patent No.: US 8,191,468 B2
(45) Date of Patent: Jun. 5, 2012

(54) SMART ANTI BURN COOKING POT

(76) Inventor: Javad Malek Azary, Tabriz (IR)

( * ) Notice: Subject to any disclaimer, the term of this patent is extended or adjusted under 35 U.S.C. 154(b) by 365 days.

(21) Appl. No.: 12/420,067

(22) Filed: Apr. 8, 2009

(65) Prior Publication Data

US 2009/0223379 A1 Sep. 10, 2009

(51) Int. Cl.
*A47J 27/00* (2006.01)

(52) U.S. Cl. .............................................. 99/417; 99/474

(58) Field of Classification Search ................... 99/467, 99/470, 473, 474, 417, 426, 447, 449
See application file for complete search history.

(56) References Cited

U.S. PATENT DOCUMENTS

| | | | | |
|---|---|---|---|---|
| 1,710,971 A * | 4/1929 | Dick | ........................ | 126/376.1 |
| 2,517,320 A * | 8/1950 | Johnston | ........................ | 99/339 |
| 3,065,744 A * | 11/1962 | Scavullo | ........................ | 126/246 |
| 4,204,607 A * | 5/1980 | Zani | ........................ | 220/626 |
| 4,210,072 A * | 7/1980 | Pedrini | ........................ | 99/340 |
| 4,258,695 A * | 3/1981 | McCarton et al. | ........... | 126/375.1 |
| 4,872,445 A * | 10/1989 | Kobayashi et al. | ........... | 126/376.1 |
| 5,647,271 A * | 7/1997 | Capelle et al. | ............. | 99/422 |
| 5,865,104 A * | 2/1999 | Sham et al. | ............... | 99/417 |
| 5,992,307 A * | 11/1999 | Parker et al. | ............... | 99/417 |
| 7,320,277 B2 * | 1/2008 | Vanthoor | ...................... | 99/422 |

\* cited by examiner

*Primary Examiner* — Steven Wong
(74) *Attorney, Agent, or Firm* — Barry Choobin; Choobin & Choobin Consultancy (57) ABSTRACT

A cooking utensil having five layer members which includes a first diaphragm member and a second diaphragm member, at least one thermostat set wherein said at least one thermostat set is situated within first layer, at least one heat sensor, wherein said at least one sensor comprises of a liquid which is sensitive to heat, a thermal induction actuator (81), which selectively closes said first diaphragm member and second diaphragm member according to temperature of the outer member of bottom of intermediate member. A hot air passage formed vertically in a part of the circumference between the sidewalls of the outer member and outer member of third layer, which causes the passage of hot air, a cool air passage formed vertically in a part of circumference between the sidewalls of outer member and inner member of second outer member which causes entering of cool air. Heat energy transmitted from the bottom of outer member will be diverted from the intermediate member and guided to outside of the cooking utensil by being spread out throughout the sidewalls of the cooking utensil. Therefore, the food in inner member which is closely contacted with the intermediate member is not scorched or burned.

1 Claim, 10 Drawing Sheets

DETAIL A
SCALE 3 : 2

FIG.1

DETAIL A
SCALE 3:2

SMART ANTI BURN COOKING POT

SPONSORSHIP STATEMENT

The present invention is sponsored by Iranian National Science foundation for international filing (INSF).

FIELD OF THE INVENTION

This invention relates to a cooking utensil for automatically controlling heating of a pan with food material in order to avoid boiling over and preventing said food material from burning at an end of a heating process, and keeping warm and cooking contents therein by suspending the heating thereof after boiling or after elapsing a predetermined time of boiling without releasing the nutritive values and perfumes of the food.

BACKGROUND OF THE INVENTION

Generally, in boiling food in a cooking pan, the pan continues to be heated over the fire even after the contents of the pan become boiled so as to ensure that the food in the pan is sufficiently soft.

It has been found, however, that most foods do not need to be cooked at a temperature of 100.degree. C. For example, potatoes and taros can be adequately boiled at temperatures of 80.degree. C. to 90.degree. C., and when meat is boiled or cooked at temperatures of not less than 80. degree. C., the protein thereof is completely denatured. Thus, it has become clear that it is not necessary to continue to heat most of foods in the pan after the food reaches 100.degree. C. and begins to be boiled.

Basically, in cooking foods, it is only necessary for most foods to be maintained at suitable temperatures, for example of 80.degree. to 90.degree. C. for a predetermined time period, for example, of 0.3 to 1 hour. Thus, generally, although energy need to be produced to initially heat the food in the pan up to a predetermined temperature, it is not necessary to continue to heat the foods and keep the food boiling except for the purpose of evaporating water, boiling down of the contents, or the like.

In addition, as a result of various investigations, it has been almost confirmed that seasoning, in other words, the permeation of impregnation of the initially added flavorings into the foods is caused by the difference of the osmotic pressure of the water in the foods or between the soup and foods for reasons of the temperature gradients in the foods occurred at the time of temperature reduction after heating or raising the temperature thereof. Thus, it is important to reduce the temperature not abruptly but smoothly and slowly so as to season the boiled food effectively. In the case of quick reduction of the temperature, the gradient of the osmotic pressure of water in the foods becomes great and the inner pressure of the foods becomes lower than that of the outside thereof. For this reason, the structure of the foods is broken and the contraction of the foods occurs.

Furthermore, it is important not to overheat the foods so as to leave the nutrition values of the respective foods and the "flavor" which is the main elements of tastes of the respective foods after cooking. This applies to the prevention of boil crumbling.

From these findings, it became apparent that, if the temperature reducing process of the foods is rendered slow by extremely preventing the scattering or radiation of the remained heat after performing necessary heating for denaturization of the respective foods, total amounts of heat and adding amounts of water used for cooking are greatly reduced and the foods sufficiently seasoned are obtained without losing their nutrition values, their flavorings, and their original shapes.

Furthermore, one of the daily problems at homes or restaurants about cooking is burning food on the stove which can be caused by forgetting or leaving the food on the stove for a long time which results in burning the food and/or boiling over. This problem knows no young or old, and it can happen to anybody who is cooking, which not only causes pecuniary problems, but also creates the problem of washing the dishes and wasted time, and above all the stench of the burnt food can cause fire. The present invention as described below would overcome all these problems.

The present invention discloses a cooking utensil, which prevents food material from burning and boiling over, and furthermore keeps warm the food material.

The present invention discloses a device not needing electric power or battery. The present invention discloses a device, which is able to cook the food with all kinds of flames or generated heat. Furthermore, the present invention discloses a device that the food therein will not be burned even after several hours of cooking.

RELATED PRIOR ARTS

A several type of cooking utensil is known and used in a kitchen and the like.

For example, the cooking utensil is made of clay, cast iron, tin or stainless steel. Then the prior cooking utensil having one layer in bottom and side wall is concentratedly heated in a portion directly contacted with the flame of a burner and the like so that the cooking food in the cooking utensil is partially burned. The burned food is not good for health of human body. And in a prior frying pan, a lot of edible oil is required not to burn the cooking food.

In order to solve the above problems, as described in U.S. Pat. No. 4,204,607, a cooking utensil 100 having multi-layer in the bottom 1 is provided as. The bottom 101 of the cooking utensil 100 comprises of aluminum or copper layer 102 welded to undersurface of the bottom 101 and a stainless steel layer 103 welded to undersurface of the aluminum or copper layer 102.

The cooking utensil 100 having triple layers 101, 102, 103 in the bottom uses the high thermal conductivity of aluminum or copper. That is, the aluminum or copper layer 102 can spread the heat energy outside of the cooking utensil 100 so that heat distribution is uniformly accomplished throughout the bottom 101 of the cooking utensil 100.

The cooking utensil 100 having triple bottom layers 101, 102, 103, however, also cannot solve the burning of the cooking food, because the heat from the flame is directly transmitted to the bottom 101 of the cooking utensil 100 having the aluminum or copper layer 102 and the stainless layer 103 directly contacted each other.

Particularly, the burning of the cooking food is seriously occurred in the boundary portion between the triple-layer at bottom and the sidewall having one layer.

Another way to solve the said problem is provided, i.e. materials such as cobalt and aluminum in which thermal conductivity is high, is used to form the inner member of the cooking utensil or coated on the inner member.

In case of the inner member of the cooking utensil being made of aluminum, since the heat transmission speed is high, the heat transmitted from the undersurface of the bottom of the cooking utensil during cooking with heating means can speedily spread throughout the whole bottom.

Therefore, the food-burning problem can be reduced to a certain extent. Some of the food cooked in the cooking utensil gets scorched and sticks on the surface of the bottom of the cooking utensil, so the food burning problem cannot be completely solved with the inner member made of aluminum.

Furthermore, the materials such as cobalt and aluminum are tender so that the inner member can be easily scratched when the cooking utensil is used and cleaned it with a scrubber.

In order to solve the prior problems, a cooking utensil having a mechanism to divert the heat from the heat source is disclosed.

SUMMARY OF THE INVENTION

The object of the present invention is to provide a cooking device for heating of food material of at least partially liquid substance which is to be boiled to switch itself off without boiling over.

Another object of the present invention is provide a cooking device for heating of food material of at least partially liquid substance which is to be cooked to switch itself off without burning the food.

Another object of the invention is to provide a cooking device capable of operating automatically and mechanically in a manner to prevent the burning of the food on the flame or on a heat source without using the electrical energy and by using the technology of heating thermostat with liquid stimulus in a working point with high quality.

Another object of the invention is to design diaphragmatic valves using limited layer thereby it can cover a large diagonal part of the layer, when it closes.

Another object of the present invention is to limit stove's heating flow in the line of the system and closing the line of heating flow and transferring it to the outer part of the system by closing the layers.

Another object of the present invention is to provide a cooking device, which prevents burning of the food material without needing for cutting the flame heat from a heat source.

Another object of the present invention is to provide a cooking device which operates based on the characteristics of the food material wherein when said food material is comprised of pea, beans, vegetables, etc, and the liquid in the pan is only water, without oil or any kind of additional food material, the system starts to work (it turns on) and on the other hand, when the whole water of food is finished, it turns off, but if the food is meat, chicken or chick-pea or beans with the food's water, oil or broth" the system works when some water (about half cup) is left.

In addition, according to the present invention, it is possible to prevent the rising of the temperature of the outer shell portion since the upper portion of the space portion between the inner vessel portion and the outer shell portion is sufficiently opened.

It is a principal object of the present invention to provide a cooking utensil in which cooking food is not scorched or burned by heat transmitted from the bottom of the cooking utensil during cooking operation even if the utensil is over heated.

Other object of the present invention is to provide a cooking utensil which may comprise either a pot or frying pan, and which includes a heat diverting means between an inner member and an outer member of the cooking utensil throughout the bottom and some part of the side wall, and an intermediate member formed of material having height thermal conductivity, which covers not only the bottom portion but also the whole side wall between the inner member and the outer member.

Another object is to provide an energy saving pot and frying pan with which food is speedily cooked with high efficiency in operation.

Yet another object of the present invention is to provide a cooking utensil, which works with all kinds of gas heating sources.

Yet another object of the present invention is to provide a cooking utensil that prevents the food material from burning even if the water in the pan is terminated or a little water left in the pan.

Another object of the present invention is to provide a cooking utensil wherein in said utensil the food which is cooked will not spoil and is kept at about 90' c.

Another object of the present invention is to provide a cooking utensil where it is possible to boil water and the water will stay at boiling temperature after some minutes without boiling.

Another object of the present invention is to provide a cooking utensil to heat the cooked food normally without needing to pour water in it.

Another object of the present invention is to provide a cooking utensil, which prevents burning of food material regardless of the operator's action.

Another object of the present invention is to provide a cooking utensil, which can be used as a rice cooker.

Yet another object of the present invention is to provide a cooking utensil, which is able to cook the food equally and more deliciously.

Yet another object of the present invention is to provide a cooking utensil, which makes cooking more economic by reducing consumption of heat energy.

Another object of the present invention is to provide a cooking utensil to prepare milk without boiling or spilling.

Yet another object of the present invention is to provide a cooking utensil, which functions based on recognizing the characteristics of food material.

A cooking utensil having five layer members which includes a first diaphragm member and a second diaphragm member, at least one thermostat set wherein said at least one thermostat set is situated within first layer, at least one heat sensor, wherein said at least one sensor comprises of a liquid which is sensitive to heat, a thermal induction actuator, which selectively closes said first diaphragm member and second diaphragm member according to temperature of the outer member of bottom of intermediate member. A hot air passage formed vertically in a part of the circumference between the sidewalls of the outer member and outer member of third layer, which causes the passage of hot air, a cool air passage formed vertically in a part of circumference between the sidewalls of outer member and inner member of second outer member which causes entering of cool air. Heat energy transmitted from the bottom of outer member will be diverted from the intermediate member and guided to outside of the cooking utensil by being spread out throughout the sidewalls of the cooking utensil. Therefore, the food in inner member, which is closely contacted, with the intermediate member is not scorched or burned.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
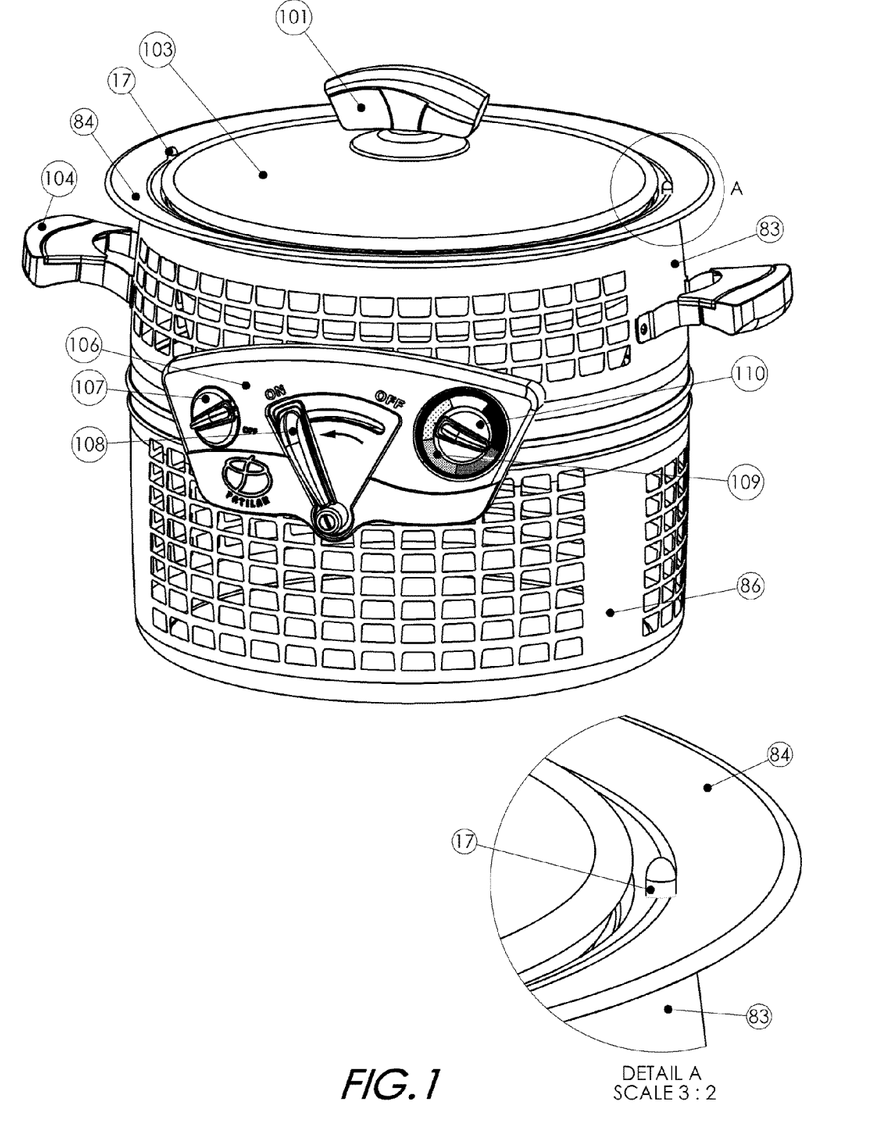
FIG. 1 is a perspective view of one embodiment of a cooking utensil in accordance with the present invention.
Figure 2:
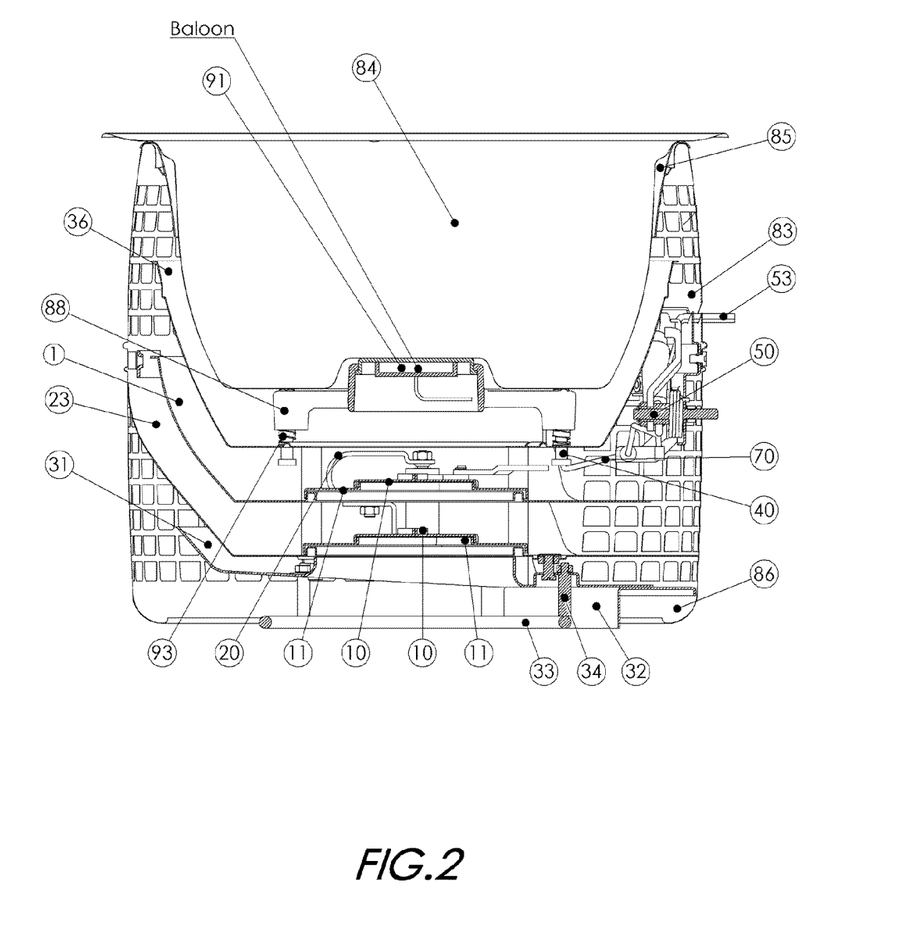
FIG. 2 is a cross-sectional view of the cooking utensil shown in FIG. 1.
Figure 3:
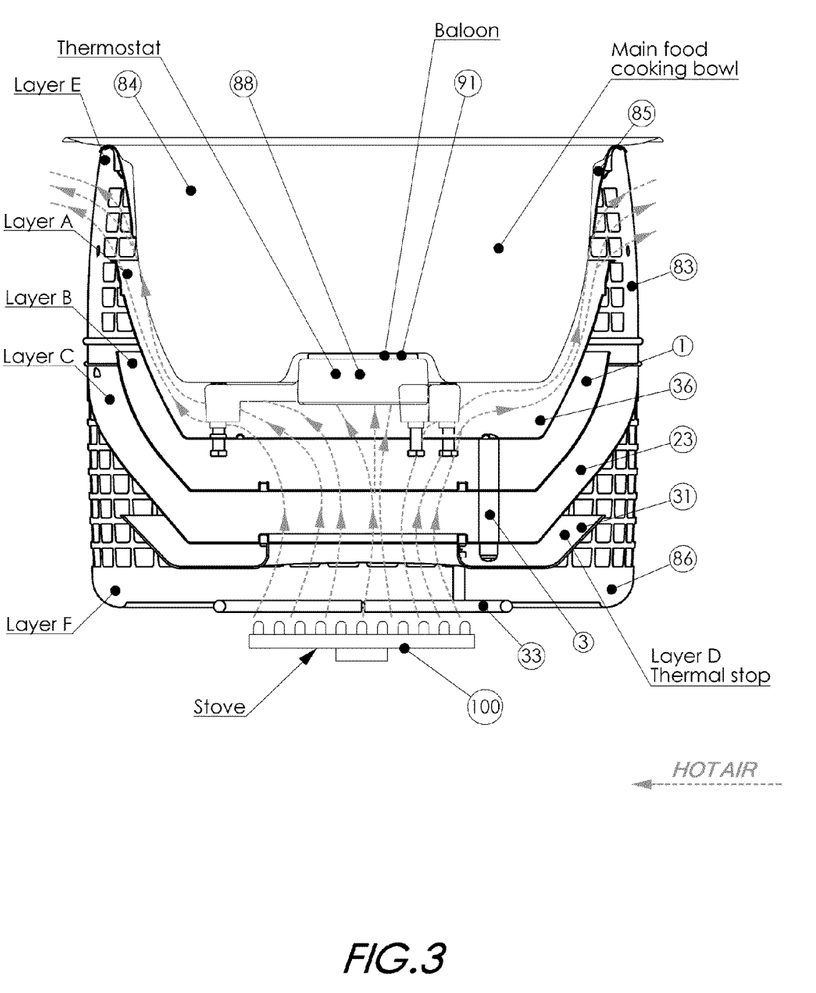
FIG. 3 is cross-sectional view of another embodiment of the invention.

Referring to FIGS. 1-10 of the drawings shown is cooking utensil in accordance with the present invention.
100—gaslight (for instance)
101—catch of the pan's glassy port
103—glassy port pan
104—system's catch (for replacing system)
106—system's bottom part volumes
83—cover E: as one of the two parts for outer covering
36—bowl A: as a chasis for domiciling thermostat
88—thermostat domicile: as placing and closing balloon (91)
1—bowl B: the first layer for stayin parts (10 & 11) and as one of the layers for crossing air
23—bowl C: the second layer for staring parts (10 & 11) and as one of the layers for crossing air
93—coil's domicile legs: coils which cause thermostat's domicile moves up and down (88)
20—upper leg: as up keeping parts (10& 11)
33—ring D: a part for setting system on the gaslight
34—leg of the rain D: a part for hitching rings D (33) to part (31)
32—fire rim: to prevent hot air crossing to the foreside of the system
85—cover G: as a seat of pan (84) on the cover (83)
50—main lever axle: as a place for setting part (53)
70—automatic reset: for turning off the system in case of picking the pan up
40—domicile main basis: as one part to make distance between bowls
59—handy reset axle: as a stir axle of part 58
66—intermediate loop V: is a loop M3 which uses to adjust
4—small intermediate washer: like part (6) it transmits movement to par Referring to the drawing, a cooking utensil embodying this invention comprises:

A. Bowels

Wherein comprises of 4 layers 36,1,23, 31 or bowels on top of each other as shown in FIGS. 1-2 Layer A—layer D 36, 1,23,31. The main pan 84 set in the layer A, 83 and 86 cover the system aggregation which functions to lead the heat air of the stove 100 to the bottom and sides of the pan (84) at the power ON position. And they have the function to lead the cool air of the outer environment into the system and the hot air of the stove 100 to the out of the stove 100 at OFF position.

Figure 6:
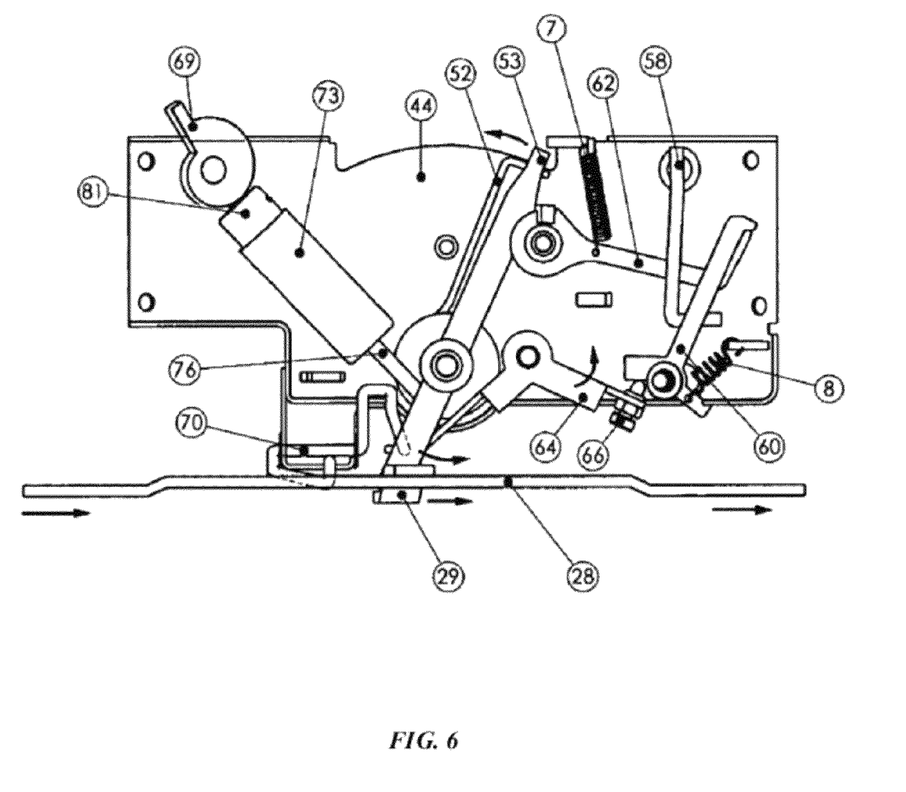
FIG. 6 is a schematic diagram representing various elements of the present invention.

B. Lever as Shown in FIG. 6

The levers of the system have the function of executing the commands received by the operator to open the diaphragm and start the action of the system. In addition, said levers close the diaphragms when the sensors expand due to excessive heat.

Complete list of parts of the levers are formed from the following parts:
1. Chassis, which all parts are mounted on 44;
2. Lever 53, which functions to open or close the diaphragms;
3. The main catch part 60;
4. The intermediate catch part 62, which has the function to fix or release the lever 53;
5. The intermediate means to lead the sensor's order to the main catch 64;
6. The motive spring 52 which prepares the lever power for closing the diaphragms;
7. Regulation screws 66 which regulates and transfers the sensor's order to the main catch by intermediate transfer;
8. Cam 69 that either rotates or reciprocates (moves back and forth) to create a prescribed motion in regulating the sensor 81 and moving it forwards and backwards;
9. The manual reset part 58, which functions as on/off switch;
10. The main turning catch spring 8;
11. The intermediate turning coil 7;
12. The sheath of keeping the part 81 to the sensor 73;
13. The automatic reset axle 70.

Figure 7:
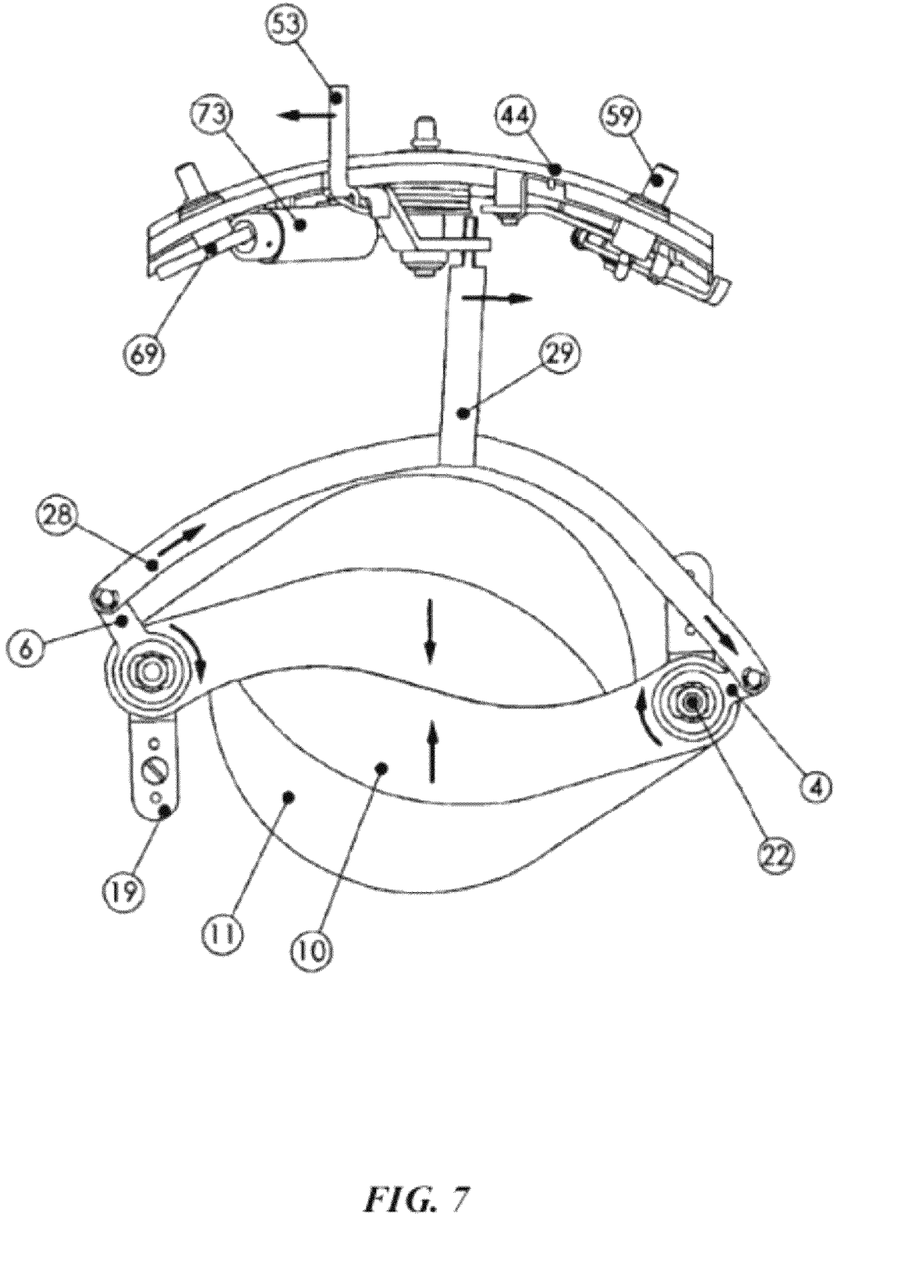
FIG. 7 is a schematic diagram, representing when the diaphragms are in closed positions.
Figure 8:
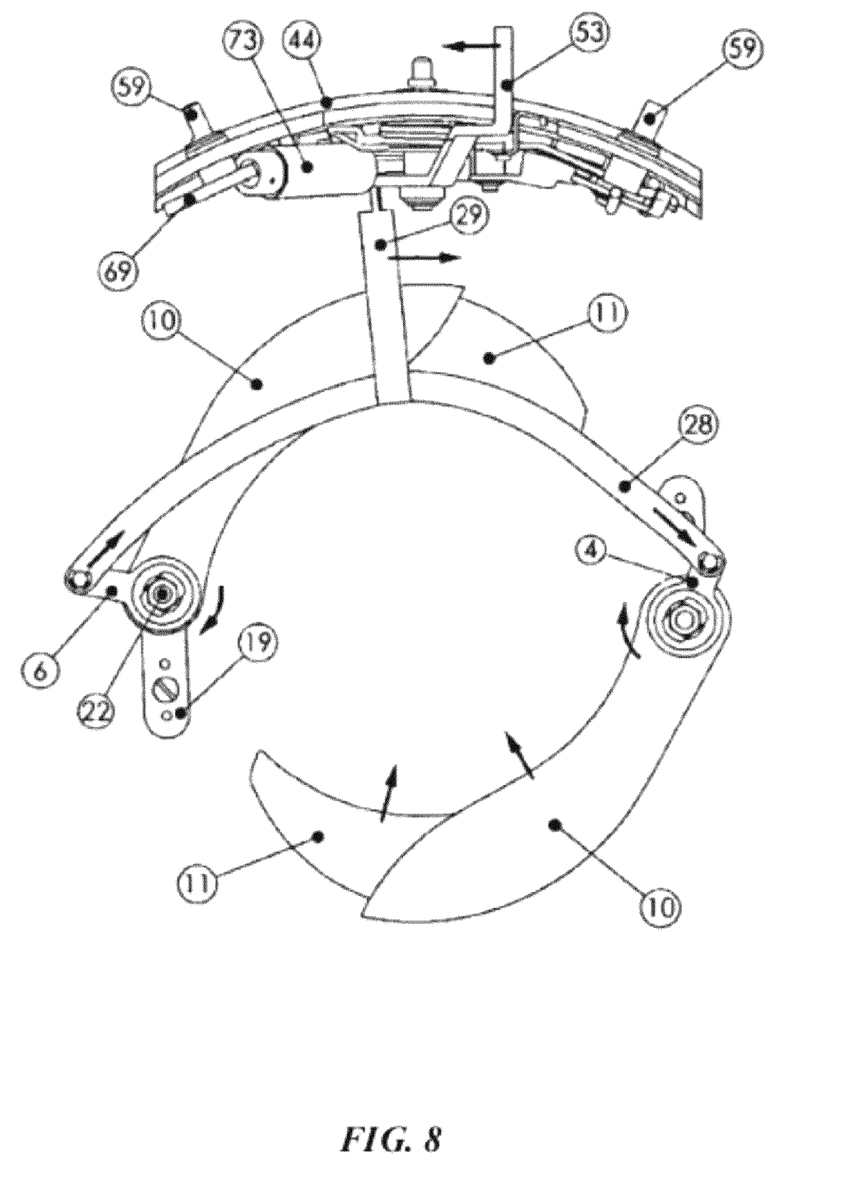
FIG. 8 is a schematic diagram, representing when the diaphragms are in open positions.
Figure 9:
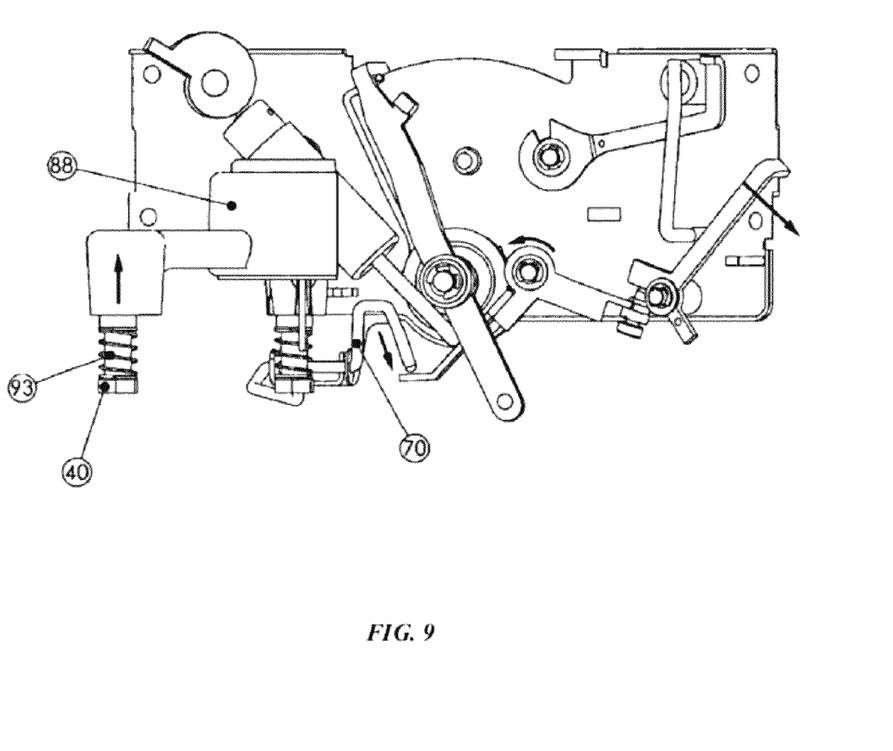
FIG. 9 is a schematic diagram of according to another embodiment of the cooking utensil in accordance with the present invention.
Figure 10:
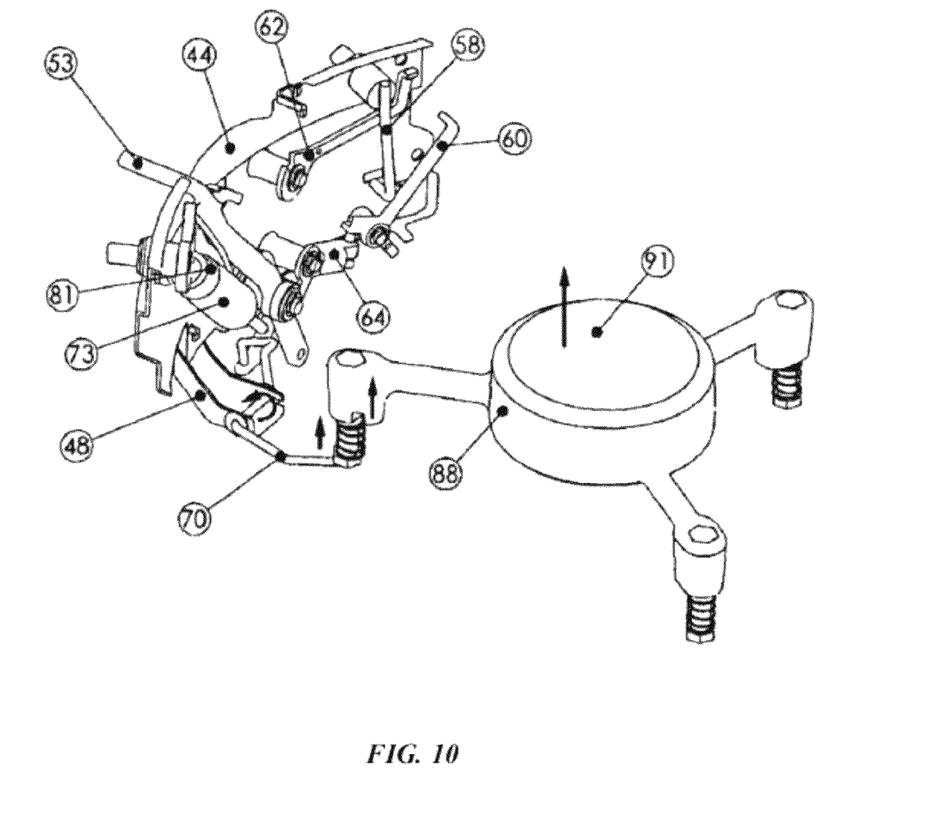
FIG. 10 is a schematic diagram of according to another embodiment of the cooking utensil in accordance with the present invention.

C. Comprehensive List of Parts Constituting the Diaphragms as Shown in FIG. 7 and FIG. 8;

The function of the diaphragms is to close or open the passing way of hot air of the flame into the system and is formed of the following parts;
1. The part for transferring lever's movement to the diaphragms 29;
2. The plug part for transferring movement to the blades 28;
3. The intermediate means 4, 6 for transferring part's movement 28 to rounding axles of diaphragms;
4. The axle of diaphragms rounding parts 22;
5. The pillars of holding axles 19;
6. The blades of diaphragms 10, 11.

D. Aggregates of System's Sensor as Shown in FIG. 5:

The function of this aggregate is to feel the burning position and order to the lever watch for closing the diaphragms.

Figure 5:
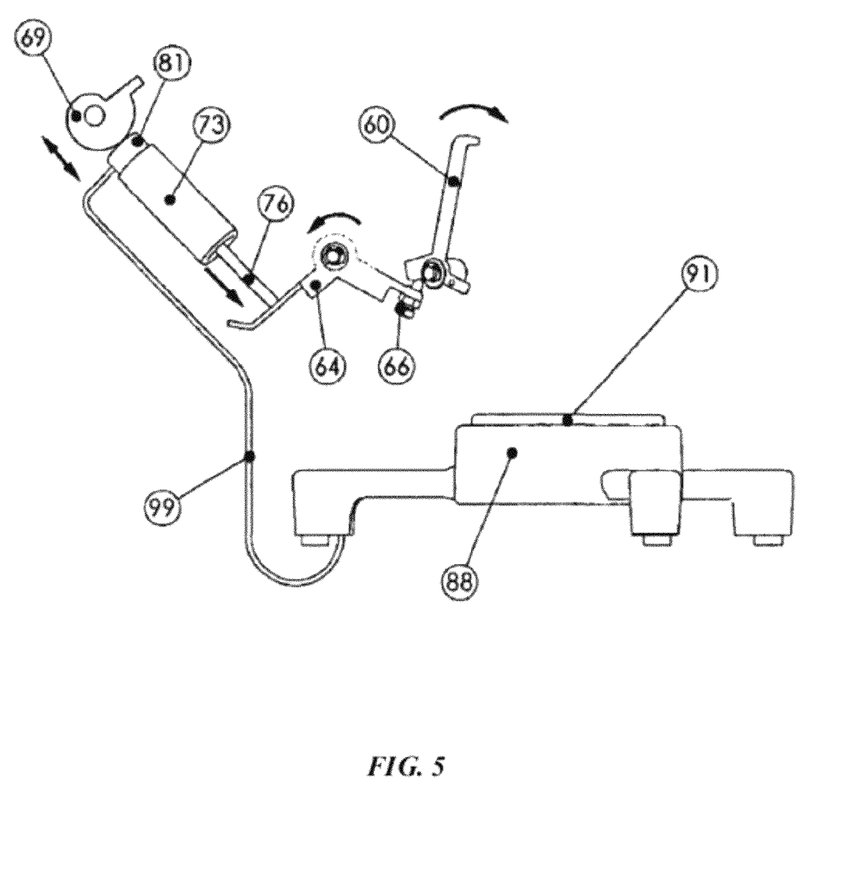
FIG. 5 is a schematic diagram representing relation between sensors and levers.

The sensor's aggregate is formed from the following parts FIG. 5:
1. A trivet frame of sensor 88;
2. An inflatable container containing a liquid substance, which is sensitive to temperature 91;
3. A tube for transferring expanded fluid to the movable part 99;
4. The motile part of the sensor part 81;
5. The moving axle part 81 to 76.

The Operation of the Invention:

Best Mode

According to preferred embodiment of the present invention, the cooking utensil is placed on the gas stove, the food materials placed in the main pan 84. The handle 108 is turned anti clockwise as shown in FIG. 1, subsequently the food materials start to cook if the gas stove is turned on.

The temperature of the bottom of the pan 84 will increase when the food gets into the burning point. The sensor 88 is in touch with the bottom of the pan, so the temperature of the sensor's balloon 91 increases and the fluid in the balloon 91 starts to expand, and the expansion causes a set of chain of reactions as described below. As a result of the expansion of the fluid sensor's balloon 91 the movable part of the sensor 81 is provoked.

The sensor 76 moves forward as a result of fluid pressure at the sensor's part 81. The movement of 76 causes the turning of 64, as shown in FIG. 6, and turns 64 around the surroundings of its own axle as shown in FIG. 5 and FIG. 6.

The movement of the 64 cause the turning of the main catch part 60. The turning of the main catch part 60 causes the intermediate catch part to be released 62.

Releasing the intermediate catch part 62 from involvement with the part 60 causes the lever's control 53 to go back to its first position as a result of spring power 52. So the part 29 from the diaphragms aggregates moves according to the arrow. The movement of the part 29 causes the movement of the part 28 in the way, which has been shown in FIG. 8. The movement of the plug part 28 causes closing the diaphragms 11, 10.

Diaphragms obstruct the passing way of hot air of the flame.

Figure 4:
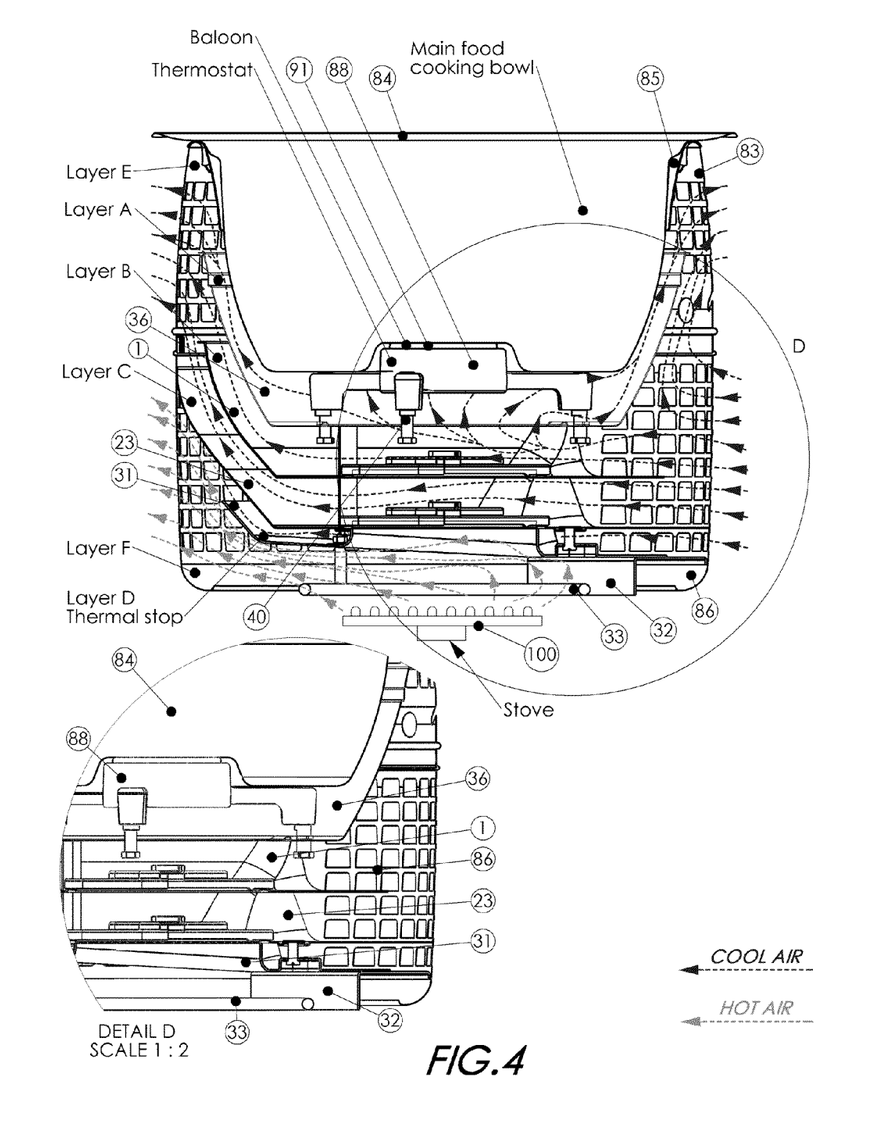
FIG. 4 is a cross-sectional view of yet another embodiment of the invention.

As a result of closing the diaphragms the hot air as shown in FIG. 4 leads to the out part of the system and the air of the environment flows into the system as shown in FIG. 4. As a result environment temperature and the temperature got from the stove, together are combined resulting in obtaining an equal temperature after some minutes. Consequently of the balance which has got the temperature degree at the side of the main pan 84 would be about 90' c.

In such degree the food doesn't burn or spoil. Because more than 75' c is the degree of the pasteurizing. This condition will last for hours and will not change. The layer D (31) as a temperature shield causes the main part of the stove's temperature leads to outer part in the off position. The cover of leaky nets F (86) helps the heat of the flames lead out.

Making Boiled Water by the System:

Setting volume 110 guides the sensor part 81 back and forward by a cam 69. The sensor part 81 is in direct and permanent touch with the axle part of sensor 76. Being backward or forward of the axle part 76 causes the part 64 to move sooner or later. When the sensor's balloon part 91 touches the water's boiling temperature, the sensor's balloon part 91 reacts in less than one minute.

As a result of the reaction of the balloon fluid part, the axle part of sensor 76 moves. The turning off action happens and the diaphragms close by leading the part 81 forward by the cam 69 about one or two minutes after water boiling by the part sensor 76 ordering and moving the part 64 as mentioned before. The boiling water stays at this position at about 90' c.

Heating cold food: For heating the cooked food, which has already been cooked before and gets cold, the food materials are poured in the pan 84 and the pan is placed on the gas stove and the system is turned on. The food will heat equally with no need to add water. The system turns off when the food's temperature gets to 105' c and it will stay at 90'c for a long time.

Automatic reset: By picking up the pan 84 from the system the system's main pillar part 88 moves upwards by the springs 93

Moving upwards of the part 88 causes the part 70 (automatic reset) to move circular to its own environment on the reset chassis part 48. The circular movement of the parts 70 causes the movement of the part 64. The movement of the part 64 as mentioned before causes the part 53 releases and the movement of the control lever part 53 to its first place causes closing the diaphragms.

Elimination of the operator's slips: The system has designed in a method that if the operator puts the pan on the system erroneously, the pan wouldn't set on the system entirely. Presence of the axles 17 and the leaks on the door of the pan 84 cause the pan not to set on the sensor entirely.

If the pan doesn't set entirely on the sensor the automatic reset acts and the system turns off.

Cooking Rice

Set the regulation volume 110 in the normal position 109. In cooking rice or something like that the temperature of the pan's bottom 84 raises when the water of it completely finishes. By raising the temperature of the sensor part 91 the axle part 76 moves and causes the diaphragms close and the food would be at the same position until we turn on the system again or decrease the temperature of the flame. When we decrease the flame and turn on the system again, the regulation volume 110 is set in the end position.

In such position when the rice steamed, the system would turn off.

To cook the food delicious and equal: The whole heat from the flame leads into the system and it leads equally to the sides of the main pan 84.

The food will cook delicious and equal because of the equal heat in the main pan 84.

Economizing the use of fuel: According to FIG. 3 the whole heat delivered from stove's fuel leads into the system and to the sides and bottom of the pan 84 and it goes out from the upper part of it, that's why the heat in this system is more than the common pan.

Cooking milk but not boiling: To cook the milk the regulation volume 110 should be at the starting part, the system would turn off before boiling (about 90-95' c), after turning off, the temperature of the system would be at 90' c. It's possible to keep the milk at this degree till cooks well and gets pasteurized. (At more than 75' c)

To Cut the Flame Heat from the Sides of the Food Pan:

Using the volume 107 and turning the part 58 from the axles aggregates as shown in FIG. 6 the intermediate catch part 62 releases and it causes the control lever 53 turn back and so the diaphragms close. By closing the diaphragms the heat connection would cut with the food for wished time and it wouldn't boil. By turning the main lever 108 to the ON position the system would start to work again.

The intelligent system: all kinds of food have a different temperature degree when they get to the burning position. For example food with only water with no oil usually starts to burn at a special degree, but food with oil or other liquid starts to burn at higher degrees than the food with water, (this is experienced by inventor on the different foods for a long period) the system can recognize the mentioned difference equivalent to ⅛ of degree Celsius according to a sensitivity of the balloon's sensor part 91. The sensor starts to work sooner for the food which is cooking with oil or other liquids (for the upper burning temperature of these kind of foods) so the system turns off before the liquid finishes, but in the foods with only water it turns off after the water finishes.

The invention is not limited to those illustrated embodiments, and various changes and modifications are possible. All modifications existing within the scope or true spirit of the invention are included in the scope of the claims of the invention.

What is claimed is:

1. A cooking utensil which comprises:
   an inner vessel portion;
   an outer shell portion having an inside diameter larger than of the inner vessel portion and a height as same as or longer than that of the inner vessel portion, said outer shell portion having a cylindrical shape, wherein said inner vessel portion is inserted into said outer shell portion to form a first layer space;

a second layer which is formed between outer members of bottom of said first layer space and inner member of bottom of said second layer;

a third layer which is formed between outer member of bottom of said second layer and inner member of bottom of said third layer;

a fourth layer which is formed between outer member of bottom of said third layer and inner member of said fourth layer;

a fifth layer which is formed between outer member of bottom of said fourth layer and inner member of bottom of said outer member;

a first diaphragm member and a second diaphragm member;

at least one thermostat wherein said at least one thermostat is situated within said first layer;

at least one heat sensor, wherein said at least one heat sensor comprises of a liquid which is sensitive to heat;

a thermal induction actuator, which selectively closes said first diaphragm member and said second diaphragm member according to temperature of the outer member of bottom of said inner vessel portion;

a plurality of hot air passages, wherein said plurality of hot air passages are formed vertically in a part of the circumference of said outer shell portion; and a plurality of cool air passages, wherein said pluralities of cool air passages are formed vertically in a part of the circumference of said outer shell portion.

* * * * *